US010259994B2

(12) United States Patent
Sparks et al.

(10) Patent No.: US 10,259,994 B2
(45) Date of Patent: Apr. 16, 2019

(54) ENHANCED SUBTERRANEAN TREATMENT FLUIDS IN IONIC WATER OR SEAWATER

(71) Applicant: Halliburton Energy Services, Inc., Houston, TX (US)

(72) Inventors: Bradley J. Sparks, Richmond, TX (US); Loan K. Vo, Houston, TX (US); James William Ogle, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/111,326

(22) PCT Filed: Feb. 13, 2014

(86) PCT No.: PCT/US2014/016257
§ 371 (c)(1),
(2) Date: Jul. 13, 2016

(87) PCT Pub. No.: WO2015/122896
PCT Pub. Date: Aug. 20, 2015

(65) Prior Publication Data

US 2016/0333261 A1 Nov. 17, 2016

(51) Int. Cl.
*C09K 8/88* (2006.01)
*C09K 8/035* (2006.01)
(Continued)

(52) U.S. Cl.
CPC ................ *C09K 8/88* (2013.01); *C09K 8/035* (2013.01); *C09K 8/602* (2013.01); *C09K 8/665* (2013.01); *C09K 8/68* (2013.01); *C09K 8/685* (2013.01); *C09K 8/845* (2013.01); *C09K 8/887* (2013.01); *C09K 8/90* (2013.01); *E21B 43/26* (2013.01); *E21B 43/267* (2013.01); *E21B 33/14* (2013.01); *E21B 37/00* (2013.01); *E21B 43/04* (2013.01)

(58) Field of Classification Search
CPC ........................................................ C09K 8/86
See application file for complete search history.

(56) References Cited

U.S. PATENT DOCUMENTS 5,480,863 A 1/1996 Oakley et al.
6,194,355 B1 2/2001 Jarrett et al.
(Continued)

OTHER PUBLICATIONS

International Search Report and Written Opinion issued in related PCT Application No. PCT/US2014/016257 dated Nov. 25, 2014, 11 pages.

(Continued)

*Primary Examiner* — William D Hutton, Jr.
*Assistant Examiner* — Avi T Skaist
(74) *Attorney, Agent, or Firm* — Thomas Rooney; Baker Botts L.L.P.

(57) ABSTRACT

Treatment fluids (e.g., fracturing fluids) comprising ionic water, and associated methods of use are provided. In one embodiment, the methods comprise providing a treatment fluid comprising an aqueous base fluid comprising one or more ionic species, a polymeric viscosifying agent carrying a first ionic charge, and an ionic surfactant carrying a second ionic charge that is the opposite of the first ionic charge; and introducing the treatment fluid into a well bore penetrating at least a portion of a subterranean formation.

19 Claims, 2 Drawing Sheets

(51) Int. Cl.

| | |
|---|---|
| ***C09K 8/60*** | (2006.01) |
| ***C09K 8/66*** | (2006.01) |
| ***C09K 8/68*** | (2006.01) |
| ***C09K 8/84*** | (2006.01) |
| ***C09K 8/90*** | (2006.01) |
| ***E21B 43/26*** | (2006.01) |
| ***E21B 43/267*** | (2006.01) |
| *E21B 33/14* | (2006.01) |
| *E21B 37/00* | (2006.01) |
| *E21B 43/04* | (2006.01) |

(56) References Cited

U.S. PATENT DOCUMENTS

2005/0126778 A1 6/2005 McElfresh et al.
2008/0269080 A1 10/2008 Hutchins et al.
2008/0280788 A1* 11/2008 Parris .................... C09K 8/685 507/211
2010/0022418 A1* 1/2010 Milne .................... C09K 8/602 507/217
2011/0177985 A1 7/2011 Saini et al.
2012/0264657 A1* 10/2012 van Zanten .............. C09K 8/36 507/112
2014/0262293 A1* 9/2014 Song ........................ C09K 8/68 166/308.2

OTHER PUBLICATIONS

Gros, Nataša, et al. "Ionic composition of seawaters and derived saline solutions determined by ion chromatography and its relation to other water quality parameters." Journal of Chromatography A 1210.1 (2008): 92-98.

Johnson, Stephen, et al. "Effects of divalent cations, seawater, and formation brine on positively charged polyethylenimine/dextran sulfate/chromium (III) polyelectrolyte complexes and partially hydrolyzed polyacrylamide/chromium (III) gelation." Journal of applied polymer science 115.2 (2010): 1008-1014.

International Preliminary Report on Patentability issued in related Application No. PCT/US2014/016257, dated Aug. 25, 2016 (8 pages).

* cited by examiner

ENHANCED SUBTERRANEAN TREATMENT FLUIDS IN IONIC WATER OR SEAWATER

CROSS-REFERENCE TO RELATED APPLICATION

The present application is a U.S. National Stage Application of International Application No. PCT/US2014/016257 filed Feb. 13, 2014,which is incorporated herein by reference in its entirety for all purposes.

BACKGROUND

The present disclosure relates to fluids and methods for use in subterranean treatment operations (e.g., fracturing operations).

Treatment fluids may be used in a variety of subterranean treatments. As used herein, the term "treatment," or "treating," refers to any subterranean operation that uses a fluid in conjunction with a desired function and/or for a desired purpose. The terms "treatment," and "treating," as used herein, do not imply any particular action by the fluid or any particular component thereof. One type of treatment used in the art to increase the conductivity of a subterranean formation is hydraulic fracturing. Hydraulic fracturing operations generally involve pumping a treatment fluid (e.g., a fracturing fluid or a "pad fluid") into a well bore that penetrates a subterranean formation at or above a sufficient hydraulic pressure to create or enhance one or more pathways, or "fractures," in the subterranean formation. These fractures generally increase the permeability and/or conductivity of that portion of the formation. The fluid may comprise particulates, often referred to as "proppant particulates," that are deposited in the resultant fractures. The proppant particulates are thought to help prevent the fractures from fully closing upon the release of the hydraulic pressure, forming conductive channels through which fluids may flow to a well bore.

Maintaining sufficient viscosity in the treatment fluids used in these operations is important for a number of reasons. Maintaining sufficient viscosity is important in fracturing and sand control treatments for particulate transport and/or to create or enhance fracture width. Also, maintaining sufficient viscosity may be important in acidizing treatments, in friction reduction and to control and/or reduce fluid loss into the formation. To provide the desired viscosity, polymeric viscosifying agents commonly are added to the treatment fluids. These viscosifying agents, when hydrated and at a sufficient concentration, are capable of forming a viscous solution. However, certain polymeric viscosifying agents can lose their stability and/or their ability to viscosify the fluid above certain temperatures (e.g., the lower critical solution temperature). In brines and seawater, this temperature may be around 110° F.-120° F., due to high concentrations of ionic species (e.g., cationics like sodium, calcium, magnesium, potassium, and anionics like phosphates, nitrates sulfates, chlorides, carbonates) dissolved therein. Many treatment fluids are often subjected to temperatures of 100° F. or more during preparation, transportation, and/or use in a formation. Thus, these ionic species may hinder hydration of viscosifying agents in a brine and/or seawater, which may render a treatment fluid in those base fluids unstable or impractical for use.

BRIEF DESCRIPTION OF THE FIGURES

These drawings illustrate certain aspects of some of the embodiments of the present disclosure, and should not be used to limit or define the disclosure.

Figure 1:
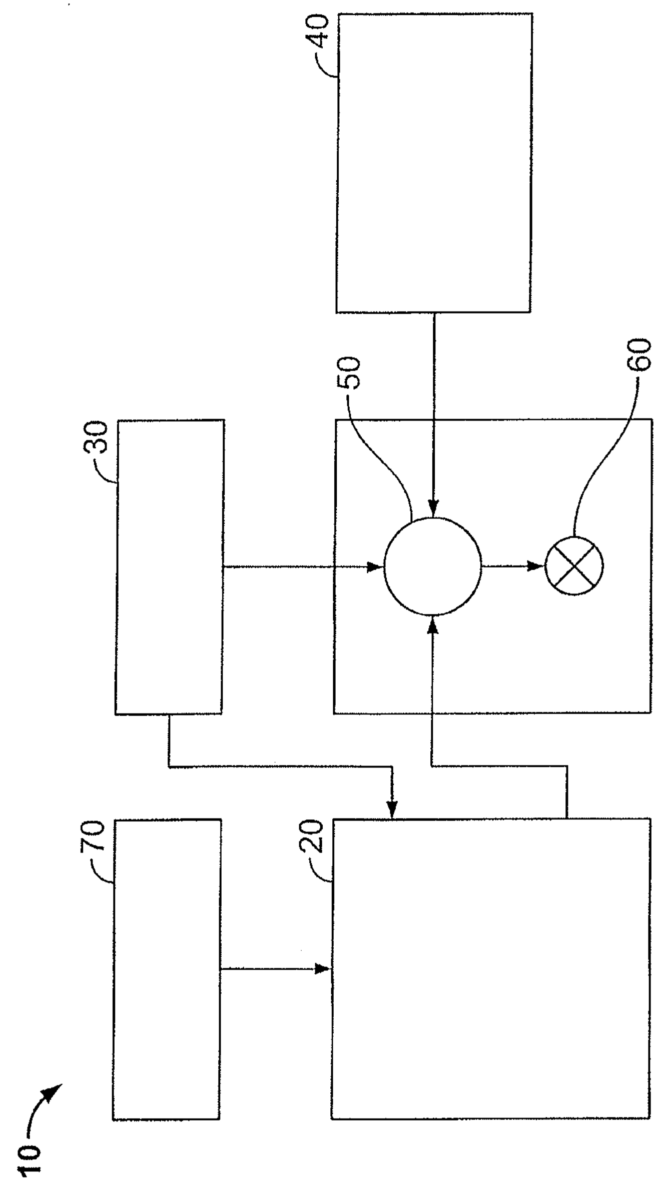
FIG. 1 is a diagram illustrating an example of a fracturing system that may be used in accordance with certain embodiments of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to fluids and methods for use in subterranean treatment operations (e.g., fracturing operations), and more specifically, treatment fluids comprising ionic water and associated methods of use.

The present disclosure provides treatment fluids that generally comprise ionic aqueous fluids comprising an aqueous base fluid, a polymeric viscosifying agent carrying an ionic charge, and a surfactant carrying the opposite ionic charge of the viscosifying agent. In certain embodiments, the treatment fluids may comprise an aqueous base fluid, an anionic polymeric viscosifying agent, and a cationic surfactant.

Without limiting this disclosure to any particular theory or mechanism of action, it is believed that the molecules of polymeric viscosifying agents impart viscosity to an aqueous fluid by maintaining their solubility in the aqueous fluid and maintaining a random coil shape in the fluid. Both the solubility of the polymer and its ability to maintain a coiled shape may be facilitated by, among other things, functional groups substituted at various locations on the polymer backbone. However, this substitution of functional groups also creates ionic sites on the polymer backbone that may be susceptible to reaction with ionic species in the aqueous fluid, which may displace water molecules that hydrate the polymer. Without limiting this disclosure to any particular theory or mechanism of action, it is believed that the cationic surfactant may inhibit (e.g., chelate with) reactive ionic species in the aqueous fluid to reduce their reactivity with ionic moieties on the polymeric backbone of the viscosifying agent, or may stabilize or sterically "block" ionic moieties on the polymeric backbone so that ionic species are not able to approach those sites. This may, among other things, increase the critical solution temperature at which the polymer loses solubility/hydration in the aqueous fluid. The methods of the present disclosure generally comprise providing such a fracturing fluid of the present disclosure, and introducing it into a well bore penetrating at least a portion of a subterranean formation at or above a pressure sufficient to create and/or enhance one or more fractures in the subterranean formation.

The methods and compositions of the present disclosure may, in certain embodiments, have a number of advantages and/or benefits, including but not limited to those described herein. For example, the treatment fluids of the present disclosure may, among other benefits, exhibit enhanced stability and/or viscosity at temperatures above about 100° F., above about 110° F. or above about 120° F., and which may expand the range of conditions at which certain polymeric viscosifying agents can be used. In certain embodiments, the methods and compositions of the present disclosure may be capable of stabilizing the viscosity of a treatment fluid at temperatures up to about 180° F., or potentially higher (e.g., up the maximum temperature at which the polymeric viscosifying agents are stable) with further optimization of the methods and compositions disclosed herein. The methods and compositions of the present disclosure also may enable the use of certain viscosifying agents in certain sources of water (e.g., seawater, produced water, etc.) where they were not previously feasible, which may lessen the demand or need for fresh water in certain applications. This may, among other benefits, enable increased usage of those viscosifying agents in offshore operations.

The treatment fluids used in the methods and systems of the present disclosure may comprise any aqueous base fluid known in the art. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate.

The viscosifying agents used in the methods and treatment fluids of the present disclosure may comprise any ionic polymer that is capable of increasing the viscosity of an aqueous fluid, for example, by forming a gel. In certain embodiments, the viscosifying agent may viscosify an aqueous fluid when it is hydrated and present at a sufficient concentration. Examples of anionic polymeric viscosifying agents that may be suitable for use in the present disclosure include, but are not limited to, cellulose and cellulose derivatives such as hydroxyethyl cellulose, carboxyethylcellulose, carboxymethylcellulose, and carboxymethylhydroxyethylcellulose. Examples of anionic polymeric viscosifying agents that may be suitable for use in the present disclosure include, but are not limited to, certain synthetic acrylate polymers. Examples of other ionic viscosifying agents that may be suitable for use in accordance with the present disclosure include, but are not limited to guar, guar derivatives (e.g., carboxymethyl guar), biopolymers (e.g., xanthan, scleroglucan, diutan, etc.), clays, modified acrylamides, acrylates, combinations thereof, and derivatives thereof. The term "derivative" is defined herein to include any compound that is made from one of the listed compounds, for example, by replacing one atom in the listed compound with another atom or group of atoms, rearranging two or more atoms in the listed compound, ionizing the listed compounds, or creating a salt of the listed compound. In certain embodiments, the viscosifying agent may be "crosslinked" with a crosslinking agent, among other reasons, to impart enhanced viscosity and/or suspension properties to the fluid. In certain embodiments, such crosslinking may be delayed to a desired time, which may be accomplished by adding a crosslinking agent to the fluid at the time that crosslinking is desired, or adding a delayed crosslinking agent that will become active at the desired time.

The viscosifying agent may be included in a treatment fluid of the present disclosure in any concentration sufficient to impart the desired viscosity and/or suspension properties to the aqueous fluid. In certain embodiments, the viscosifying agent may be included in a concentration of from about 10 pounds per 1000 gallons (pptg) of the aqueous fluid to about 200 pptg of the aqueous fluid. In certain embodiments, the viscosifying agent may be included in a concentration of from about 10 pptg of the aqueous fluid to about 160 pptg of the aqueous fluid. A person of skill in the art, with the benefit of this disclosure, will recognize the concentration and amount of viscosifying agent to use in a particular embodiment of the present disclosure based on, among other things, the content of the aqueous fluid, the temperature and pH conditions where the treatment fluid will be used, additional additives present in the treatment fluid, and the like.

The surfactants used in the methods and treatment fluids of the present disclosure may comprise any ionic surfactant known in the art carrying a charge opposite that of a polymeric viscosifying agent in the treatment fluid. In certain embodiments, cationic surfactants that may be suitable for use in embodiments of the present disclosure comprised quaternized short-chain (e.g., up to about 5000 repeating units) oligomers with various functional groups grafted thereon. Examples of cationic surfactants that may be suitable for certain embodiments of the present disclosure include, but are not limited to, oligomeric quaternary ammonium salts (e.g., trimethyltallowammonium chloride), alkyl amines, alkyl amine salts, amine oxides, alkyltrimethyl amines, triethyl amines, alkyldimethylbenzylamines, alkylamidobetaines such as cocoamidopropyl betaine, alpha-olefin sulfonate, $C_8$ to $C_{22}$ alkylethoxylate sulfate, trimethylcocoammonium chloride, derivatives thereof, and combinations thereof. Examples of anionic surfactants that may be suitable for certain embodiments of the present disclosure include, but are not limited to, alkyl carboxylates, alkylether carboxylates, N-acylaminoacids, N-acylglutamates, N-acylpolypeptides, alkylbenzenesulfonates, paraffinic sulfonates, $\alpha$-olefinsulfonates, lignosulfates, derivatives of sulfosuccinates, polynapthylmethylsulfonates, alkyl sulfates, alkylethersulfates, monoalkylphosphates, polyalkylphosphates, fatty acids, alkali salts of acids, alkali salts of fatty acids, alkaline salts of acids, sodium salts of acids, sodium salts of fatty acid, alkyl ethoxylate, soaps, derivatives thereof, and combinations thereof.

The ionic surfactant may be included in a treatment fluid of the present disclosure in any concentration sufficient to neutralize the ionic species in the aqueous fluid and/or to "block" reactive cites on the viscosifying agent polymer. In certain embodiments, the ionic surfactant may be included in a concentration of from about 0.01% to about 10% by volume of the aqueous fluid. A person of skill in the art, with the benefit of this disclosure, will recognize the concentration and amount of viscosifying agent to use in a particular embodiment of the present disclosure based on, among other things, the ionic content of the aqueous fluid, the temperature and pH conditions where the treatment fluid will be used, additional additives present in the treatment fluid, and the like. In certain embodiments, the ionic surfactant may be added to the aqueous fluid before the viscosifying agent is added, among other reasons, to neutralize ionic species in the aqueous fluid before attempting to hydrate the viscosifying agent.

In certain embodiments, the treatment fluids used in the methods and systems of the present disclosure optionally may comprise any number of additional additives, among other reasons, to enhance and/or impart additional properties of the composition. In one embodiment, a treatment fluid of the present disclosure may further include a crosslinking agent (e.g., an instant and/or delayed crosslinking agent), a breaker (e.g., an instant and/or delayed breaker), a clay control agent, a scale inhibitor, and a bacteriacide. Other examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

The methods and systems of the present disclosure may be used during or in conjunction with any subterranean operation. Examples of subterranean operations in which the methods and/or treatment fluids of the present disclosure may be used include, but are not limited to, pre-flush treatments, after-flush treatments, hydraulic fracturing treatments, sand control treatments (e.g., gravel packing), "frac-pack" treatments, acidizing treatments (e.g., matrix acidizing or fracture acidizing), well bore clean-out treatments, cementing operations, workover treatments/fluids, and other operations where a treatment fluid may be useful. For example, a fracturing fluid may be introduced into the formation at or above a pressure sufficient to create or enhance one or more fractures in at least a portion of the subterranean formation. Such fractures may be "enhanced" where a pre-existing fracture (e.g., naturally occurring or otherwise previously formed) is enlarged or lengthened by the fracturing treatment. Other suitable subterranean operations in which the methods and/or compositions of the present disclosure may be used include, but are not limited to, fracture acidizing, "frac-pack" treatments, and the like.

The fracturing fluids used in the methods and systems of the present disclosure may be prepared using any suitable method and/or equipment (e.g., blenders, stirrers, etc.) known in the art at any time prior to their use. In some embodiments, the fracturing fluids may be prepared at a well site or at an offsite location. In certain embodiments, an aqueous fluid may be mixed with the viscosifying agent first, among other reasons, in order to allow the gelling agent to hydrate. Then, proppants, the ionic surfactant, and/or other additives may be mixed into the viscosified fluid. Once prepared, a fracturing fluid of the present disclosure may be placed in a tank, bin, or other container for storage and/or transport to the site where it is to be used. In other embodiments, a fracturing fluid of the present disclosure may be prepared on-site, for example, using continuous mixing or "on-the-fly" methods, as described below.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) used, among other purposes, to alter the properties of the fracturing fluid. In other embodiments, other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional additives from the additives source 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, proppant source 40, and/or additives source 70 may be equipped with one or more metering devices (not shown) to selectively control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
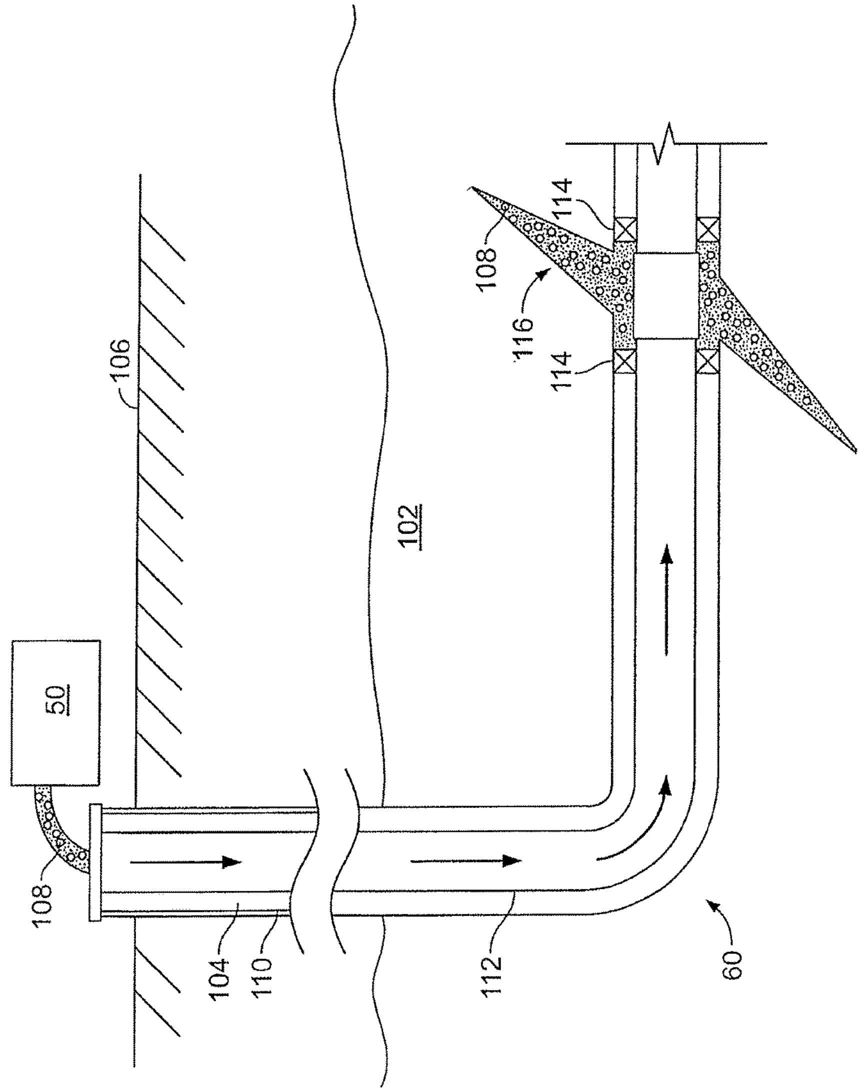
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method comprising: providing a treatment fluid comprising an aqueous base fluid comprising one or more ionic species, a polymeric viscosifying agent carrying a first ionic charge, and an ionic surfactant carrying a second ionic charge that is the opposite of the first ionic charge; and introducing the treatment fluid into a well bore penetrating at least a portion of a subterranean formation.

Another embodiment of the present disclosure is a method comprising: providing a fracturing fluid comprising an aqueous base fluid comprising seawater, an anionic polymeric viscosifying agent selected from the group consisting of: carboxymethylcellulose; carboxymethylhydroxyethylcellulose; and any combination thereof, and a cationic surfactant; and introducing the fracturing fluid into a well bore penetrating at least a portion of a subterranean formation at or above a pressure sufficient to create or enhance one or more fractures in the portion of the subterranean formation, wherein the temperature in at least a portion of the subterranean formation is above about 100° F.

Another embodiment of the present disclosure is a method comprising: preparing a subterranean treatment fluid by providing an aqueous base fluid comprising one or more ionic species, adding to the aqueous base fluid an ionic surfactant carrying a first ionic charge, and after adding the ionic surfactant, adding to the aqueous fluid a polymeric viscosifying agent carrying a second ionic charge that is the opposite of the first ionic charge, and allowing the polymeric viscosifying agent to hydrate in the aqueous fluid introducing the treatment fluid into a well bore penetrating at least a portion of a subterranean formation; and introducing the subterranean treatment fluid into a well bore penetrating at least a portion of a subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:

providing a treatment fluid comprising:

an aqueous base fluid comprising one or more ionic species, a polymeric viscosifying agent carrying a first ionic charge, and an ionic surfactant carrying a second ionic charge that is the opposite of the first ionic charge, wherein the ionic surfactant comprises at least one surfactant selected from the group consisting of: an alkyltrimethyl amine; a triethyl amine; a $C_8$ to $C_{22}$ alkylethoxylate sulfate; any derivative thereof; and any combination thereof;

introducing the treatment fluid into a well bore penetrating at least a portion of a subterranean formation; and inhibiting a reaction of one or more ionic moieties in the polymeric viscosifying agent with the one or more ionic species using the ionic surfactant so as to increase a critical solution temperature of the treatment fluid.

2. The method of claim 1 further comprising allowing the ionic surfactant to block one or more ionic moieties in the polymeric viscosifying agent from interacting with the ionic species in the aqueous base fluid.

3. The method of claim 1 wherein the aqueous base fluid comprises seawater.

4. The method of claim 1 wherein the temperature in at least a portion of the subterranean formation is above about 100° F.

5. The method of claim 1 wherein the polymeric viscosifying agent comprises an anionic polymer and the ionic surfactant comprises a cationic surfactant.

6. The method of claim 1 wherein the polymeric viscosifying agent is selected from the group consisting of: hydroxyethyl cellulose; carboxyethylcellulose; carboxymethylcellulose; carboxymethylhydroxyethylcellulose; an acrylate; carboxymethyl guar; xanthan; scleroglucan; diutan; a clay; an acrylamide; any combination thereof; and any derivative thereof.

7. The method of claim 1 wherein the polymeric viscosifying agent is selected from the group consisting of: carboxymethylcellulose; carboxymethylhydroxyethylcellulose; and any combination thereof.

8. The method of claim 1 wherein providing the treatment fluid further comprises mixing the aqueous base fluid, the polymeric viscosifying agent, and the ionic surfactant using mixing equipment to form the treatment fluid.

9. The method of claim 1 wherein the treatment fluid further comprises a crosslinking agent.

10. The method of claim 1 wherein the treatment fluid is introduced into the well bore using one or more pumps.

11. A method comprising:

providing a fracturing fluid comprising:

an aqueous base fluid comprising seawater; wherein the seawater further comprises one or more ionic species, an anionic polymeric viscosifying agent selected from the group consisting of: carboxymethylcellulose; carboxymethylhydroxyethylcellulose; and any combination thereof, and a cationic surfactant, wherein the cationic surfactant comprises at least one surfactant selected from the group consisting of: an alkyltrimethyl amine; a triethyl amine; a $C_8$ to $C_{22}$ alkylethoxylate sulfate; any derivative thereof; and any combination thereof;

introducing the fracturing fluid into a well bore penetrating at least a portion of a subterranean formation at or above a pressure sufficient to create or enhance one or more fractures in the portion of the subterranean formation, wherein the temperature in at least a portion of the subterranean formation is above about 100° F.; and inhibiting a reaction of one or more anionic moieties in the anionic polymeric viscosifying agent with the one or more ionic species using the cationic surfactant so as to increase a critical solution temperature of the fracturing fluid.

12. The method of claim 11 wherein the temperature in at least a portion of the subterranean formation is above about 110° F.

13. The method of claim 11 wherein the fracturing fluid further comprises a plurality of proppant particulates.

14. The method of claim 13 further comprising depositing at least a portion of the proppant particulates in at least a portion of a fracture in the subterranean formation.

15. A method comprising:

preparing a subterranean treatment fluid by:

providing an aqueous base fluid comprising one or more ionic species, adding to the aqueous base fluid an ionic surfactant carrying a first ionic charge, wherein the ionic surfactant comprises at least one surfactant selected from the group consisting of: an alkyltrimethyl amine; a triethyl amine; a $C_8$ g to $C_{22}$ alkylethoxylate sulfate; any derivative thereof; and any combination thereof, and after adding the ionic surfactant, adding to the aqueous fluid a polymeric viscosifying agent carrying a second ionic charge that is the opposite of the first ionic charge, and allowing the polymeric viscosifying agent to hydrate in the aqueous fluid;

introducing the subterranean treatment fluid into a well bore penetrating at least a portion of a subterranean formation; and inhibiting a reaction of one or more ionic moieties in the polymeric viscosifying agent with the one or more ionic species using the ionic surfactant so as to increase a critical solution temperature of the treatment fluid.

16. The method of claim 15 wherein the polymeric viscosifying agent is selected from the group consisting of: carboxymethylcellulose; carboxymethylhydroxyethylcellulose; and any combination thereof.

17. The method of claim 16 wherein the aqueous base fluid comprises seawater.

18. The method of claim 1, wherein the polymeric viscosifying agents impart a viscosity to the aqueous base fluid by maintaining its solubility in the aqueous base fluid and maintaining a random coil shape in the aqueous base fluid.

19. The method of claim 1, wherein the critical solution temperature is the temperature at which the polymeric viscosifying agent loses solubility in the aqueous base fluid.

* * * * *